United States Patent Office 3,600,308
Patented Aug. 17, 1971

3,600,308
METHOD OF CLARIFYING AQUEOUS SUSPENSIONS WITH POLYMERIZED LIGNIN DERIVATIVES
George G. Allan, Seattle, Wash., assignor to Weyerhaeuser Company, Tacoma, Wash.
No Drawing. Continuation-in-part of application Ser. No. 602,185, Dec. 16, 1966. This application Sept. 12, 1969, Ser. No. 857,542
Int. Cl. C02b 1/20
U.S. Cl. 210—52                                    10 Claims

ABSTRACT OF THE DISCLOSURE

A forest-derived material for use as a coagulant and the method of use of the coagulant is described. Lignin and ligno-sulfonate materials are reacted with various chemical agents to increase their molecular weight for use as coagulants. The method of using high molecular weight, forest-derived phenolic polymers as coagulants and clarifying agents in aqueous systems is described. The novel coagulants may be used in conjunction with traditionally used coagulants to increase the rate of coagulation.

---

This application is a continuation-in-part of my copending application, Ser. No. 602,185, filed Dec. 16, 1966, now U.S. Pat. No. 3,470,148.

The invention herein described relates to processes for making compounds useful as coagulants and coagulation aids from forest-derived materials and to the novel products obtained thereby. Moreover, this invention relates to a method of coagulating colloidal suspensions using the novel products of this invention.

The clarification of water has, of recent, become most important in controlling pollution of the nation's water supplies and in treating water used in the chemical processing industry. One of the essential processes of the majority of water treatment plants involves the addition of a chemical coagulant which causes aggregation of some of the fine particles and absorption of others to produce a larger particle called a floc. The purpose of chemical coagulation of colloidal suspensions in sewage and other wastes is the removal of particulate matter which cannot be separated from the liquid by gravity alone. Solid particles in the colloidal state (approximately 1 m$\mu$ to 1$\mu$) which are dispersed in aqueous media are usually negatively charged and are maintained separate by mutual repulsive forces. If the charge on these particles is reduced to zero, the repulsive forces are eliminated enabling agglomeration and settling of suspended matter. In practice, the neutralization of these charges is best accomplished by reaction with either ions or colloids bearing charges opposite in sign to the charges on the colloids to be removed. As the majority of colloids in domestic sewage and other wastes is negatively charged, they are neutralized primarily by reaction or contact with materials which are cationic (positively charged) in character.

The chemicals which have been most useful as coagulants are salts of polyvalent metals, such as aluminum sulfate (alum), ferrous sulfate, ferric chloride, and lime. Alum, for example, functions as a coagulant by its tendency to hydrolyze and polymerize in aqueous solutions to a positively charged complex which links the small negatively charged particles together. Treatment with alum or with other inorganic salts has been successful in removing the coarse fraction (1 mm. to 1$\mu$) of electro-negative particles but not the fine fraction 1$\mu$ to 10 A). The fine fraction has been removed, however, by employing simultaneously with the inorganic coagulant an organic polyelectrolyte. Many of the polyelectrolytes act as coagulants and coagulation aids, that is, they form large floc particles that settle through the solution and absorb the particles of coagulated turbidity. Coagulation aids act as "binders" in that they bind existing floc particles together into larger masses. The organic polyelectrolytes are classified as either cationic or anionic in character. Cationic polyelectrolytes are positive charged and will neutralize the negative charges on suspended particles, allowing them to agglomerate. Anionic polyelectrolytes are negatively charged and function as co-coagulants when applied along with a cationic material.

Many organic polyelectrolyte coagulants and coagulation aids are in commercial use today, but they suffer the disadvantage of being relatively expensive.

It is an object of this invention to provide novel compounds useful as coagulants and coagulation aids, the compounds being derived from by-products of the wood industry.

It is a further object of this invention to provide a relatively simple and inexpensive process for making the novel products.

Phenolic bodies, particularly bark extractives and lignins, are readily available by-products of the wood industry and have been used extensively as dispersants by virtue of their low cost, availability, and polymeric nature. For example, see the article "Chemicals From the Other Half of the Tree" in Chemical and Engineering News, Feb. 11, 1963, pages 83 to 89, and U.S. Pat. No. 2,782,241.

Such phenolic bodies including lignins and lignosulfonates may have their molecular weight increased by a number of processes. One type of lignin sulfonate phenolic bodies obtained from spruce wood is reported to have a molecular weight range of approximately 5,000 to over 130,000 with intrinsic viscosities of less than about 0.07 average as reported by Yean, Rezanowich and Goring in Proceedings of the International Symposium on the Chemistry and Biochemistry of Lignin, Cellulose and Hemicellulose, 1965, pages 327–343.

It has now been found that the lignin and lignosulfonate materials derived from forest products, which heretofore had been used for dispersants are useful as coagulants when the molecular weight of these materials is increased. The materials are especially useful as coagulation aids when used in conjunction with conventional inorganic polyvalent metal coagulants and/or organic polyelectrolytes. The particular forest-derived materials which may be used in this manner include the higher molecular weight portions of the alkaline extracts of barks of trees and pulping liquors, particularly kraft lignins and sulfite lignins. These materials, which are anionic in character, as used to link or bridge the coagulated particles which as a result of coagulation have cationic sites to obtain larger, faster settling aggregates.

It has been found that the coagulation activity of the phenolic bodies contained in bark extractives and pulping liquors can be substantially improved by chemical modification which increases the molecular weight of the material and, in some cases, decreases their anionic character. The anionic character of the phenolic materials may be diminished by reducing the number of free phenolic hydroxyl groups in the molecule and/or introducing cationic centers on the molecule. Extracted lignin and lignosulfonate molecules prior to chemical modification usually have average molecular weights of less than about 5,000 which corresponds to an intrinsic viscosity of less than about 0.05. Upon modification the average molecular weights may be increased to a value in excess of about 500,000, at which the material has an intrinsic viscosity in excess of 0.1. Such materials has significant coagulation action when used in clarifying water containing suspended matter.

The phenolic material derived from bark extractives and pulping liquors may be chemically modified by reaction with at least one of the following:

(1) an aldehyde, such as formaldehyde or paraformalde;

(2) a triazine derivative designated by

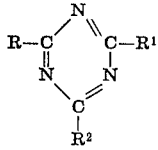

where R, R$^1$, and R$^2$ represent chlorine, methoxy groups or —NHCH$_2$OH groups:

(3) Y—CH$_2$—(CH$_2$)$_n$—X where $n$ is a positive integer from 0 to 5, X is one of the following:

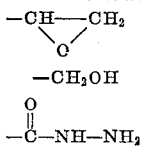

—CH$_2$OH $$-\overset{O}{\underset{\|}{C}}-NH-NH_2$$

and Y is one of the following:

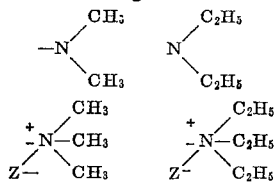

with Z$^-$ being chlorine or bromine:

(4)
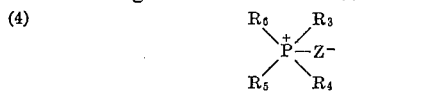

where Z$^-$ is chlorine or bromine, and R$_3$, R$_4$, R$_5$, and R$_6$ are functional groups reactive with the phenolic compounds of the forest-derived products, for example, methylol groups;

(5)
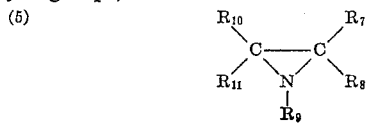

where R$_7$, R$_8$, R$_9$, R$_{10}$, and R$_{11}$ are hydrogen, aliphatic, aromatic, or various substituted aliphatic and aromatic groups.

Exemplary of some of the specific compounds which may be used for reaction with the phenolic forest-derived compounds are cyanuric chloride, formaldehyde, tetrakishydroxymethyl phosphonium chloride, trimethylolmelamine, 2,4-dichloro - 6 - methoxy-s-triazine, choline chloride, N,N-diethylglycidylamine, ethyleneimine, hydrazines, and amine-modified epoxy-compounds.

Chemical modification can also be carried out by oxidative coupling of the phenolic forest-derived products with oxidizing agents, such as are used to convert vanillin to dehydrodivanillin or which promote the well known oxidative coupling reactions typified by the formation of usnic acid. Typical of such oxidizing agents are gaseous oxygen, air, nascent oxygen, hydrogen peroxide, the alkali metal persulfates, permanganates, perborates and dichromates. Many oxidizing agents in addition to those listed above which find use in the oxidative coupling of phenols are listed in "Phenol Coupling" by H. Musso in Oxidative Coupling of Phenols, ed. by Taylor and Battersby, 1967, pages 1–84, which is incorporated herein by reference.

The phenolic forest-derived materials used in the process of this invention and present in the novel products are derived from bark extractives of trees and pulping liquors. Kraft and soda lignins as well as sulfite lignins may be used. The alkaline extracts of barks of trees are particularly useful. Such extracts may be obtained by a process described, for example, in U.S. Patent Nos. 2,890,231 and 3,255,221, which are hereby incorporated by reference.

The reaction between the phenolic forest-derived products and the various chemicals mentioned above is carried out by merely mixing the materials together. The reaction may be carried out in the presence of any inert liquid which may serve as a diluent. This liquid may or may not be a solvent for the reaction. The reaction mixture may be heated to increase the reaction rate, however, in most cases reaction proceeds at ambient temperatures. The weight ratio of phenolic compounds per modifying chemical may be varied to suit the particular requirements for which the compound is to be used. Generally a weight ratio of phenolic material to modifying chemical ranging from about 2:1 to 15:1 is adequate.

Because of the complex nature of the phenolic compounds derived from bark extractives and pulping liquors, the reaction of these materials with the various chemicals cannot be exactly formulated. The chemicals contained in bark extractives and in pulping liquors include ligneous materials having various functional groups such as phenolic hydroxyl groups, methoxyl groups, and carboxyl groups. For example, the functional groups contained in the caustic extract of Douglas fir bark, kraft lignin, and sulfite lignin are shown below.

| Group | Caustic extract of Douglas fir bark, percent | Kraft lignin, percent | Sulfite lignin, percent |
| --- | --- | --- | --- |
| Methoxyl | 3.5 | 15 | 13 |
| Carboxyl | 15 | 0.5 | 0.5 |
| Phenolic | 10 | 4 | 2.5 |
| Alcoholic | 1.5 | 0.5 | 0.5 |
| Carbonyl | 3.2 | 1.8 | 1.4 |

Practical methods for removal of colloidal particles from sewage and wastes are typically carried out in three stages. In the first, one or more chemical coagulants and coagulation aids are added to the sewage or wastes and distributed as quickly and uniformly as possible (flash-mixing). The second stage is flocculation. It is the most important step and is usually carried out in long slowly stirred tanks. The third stage is the final agglomeration of the particles and is greatly aided by the addition of coagulation aids, usually long chain high molecular weight molecules.

The unmodified phenolic forest-derived compounds from bark extractives and pulping liquors are useful only as coagulation aids in conjunction with conventional coagulants, either organic or inorganic. The chemically modified compounds, however, may be used as coagulants or coagulation aids with or without the addition of other conventional coagulants, such as alum and known organic polyelectrolytes.

Small amounts, i.e. 1 to 500 p.p.m. of the unmodified and modified phenolic forest-derived products are generally sufficient for treatment of sewage and other wastes. The optimum amount for treating a particular system is dependent on the kind and amount of coagulant and/or coagulation aid, temperature, pH, concentration of dissolved solids, rate of mixing, design of equipment, and the type of colloidal material encountered.

The modified compounds of this invention are particularly applicable to the water treatment of sewage wastes but can also be used in the clarification of brines and slurries, froth flotation processes, and in thickening processes of various kinds.

The following examples serve to illustrate the preparation of compounds according to this invention and are not intended to be limiting in any way.

EXAMPLE I

A caustic extract of Douglas fir bark, 20 grams, in 200 ml. water at about 10° C. and a pH of 8.8 was treated with a solution of 3 grams of cyanuric chloride dissolved in 20 ml. of dioxane added dropwise with stirring. The reaction mixture was maintained below 10° C. and stirred for about 1 hour and then allowed to warm to room temperature. During the reaction the pH was maintained at about 9 by the addition of 35 ml. of 1 N sodium hydroxide. The reaction solution was added directly to an aqueous dispersion difficult to coagulate.

EXAMPLE II

A solution of sodium lignosulfonate, 35 grams in 200 ml. of water, was stirred at about 10° C. and pH 9 with 3 grams of cyanuric chloride dissolved in 20 ml. of dioxane for 90 minutes. The reaction solution was added directly to an aqueous dispersion difficult to coagulate.

EXAMPLE III

A solution of a caustic extract of Douglas fir bark, 10 grams, was heated for two hours at 70–80° C. with 2.7 grams of a 37% solution of formaldehyde and 0.5 gram sodium hydroxide in a total volume of 160 ml. The reaction solution was added directly to an aqueous dispersion difficult to coagulate.

EXAMPLE IV

A solution of kraft lignin, 100 grams in 500 ml. water containing 4 grams of sodium hydroxide, was heated for two hours with 54 ml. of a 37% solution of formaldehyde and allowed to stand overnight. The reaction solution was added directly to an aqueous dispersion difficult to coagulate.

EXAMPLE V

A solution of sodium lignosulfonate (Marasperse "N"), 30 grams in 215 ml. water at pH 11, was refluxed for about two hours with 16 ml. of a 37% solution of formaldehyde. The reaction mixture was added directly to an aqueous dispersion difficult to coagulate.

EXAMPLE VI

A solution of the compound of Example III, 18.6 grams in 200 ml. of water, was stirred at less than 10° C. with 3 grams of cyanuric chloride dissolved in dioxane for one hour and then at ambient temperature for an additional hour. The reaction product was added directly to an aqueous dispersion difficult to coagulate.

EXAMPLE VII

A solution of a caustic extract of Douglas fir bark, 20 grams, was stirred with a pre-reacted mixture of 3 grams of cyanuric chloride and 2.3 grams of choline chloride at about 10° C. for about one hour, then at ambient temperature overnight. The reaction product was added directly to an aqueous dispersion difficult to coagulate.

EXAMPLE VIII

Kraft lignin, 5 grams, was added to a pre-reacted mixture of 1.84 grams cyanuric chloride and 1.4 grams choline chloride at about 10° C. and stirred for 90 minutes. Some precipitation occurred. The supernatant material was added directly to an aqueous dispersion difficult to coagulate.

EXAMPLE IX

A solution of a caustic extract of Douglas fir bark, 10 grams in 135 ml. of water, was heated with 1 gram of tetrakishydroxymethyl phosphonium chloride and 0.5 gram of sodium hydroxide for about two hours at 70–80° C. The reaction product was added directly to an aqueous dispersion difficult to coagulate.

EXAMPLE X

A solution of a caustic extract of Douglas fir bark, 6 grams in 100 ml. water, was stirred with 1.84 grams cyanuric chloride at about 10° C. for about one hour and then 1.22 grams of tetrakishydroxymethyl phosphonium chloride were added and the solution stirred for an additional hour. The reaction solution was added directly to an aqueous dispersion difficult to coagulate.

EXAMPLE XI

A solution of a caustic extract of Douglas fir bark, 20 grams in 200 ml. water, was heated with trimethylolmelamine made by condensing 2 grams of melamine with 4 ml. of a 37% solution for formaldehyde, under reflux conditions for about 30 minutes. The reaction solution was added directly to an aqueous dispersion difficult to coagulate.

EXAMPLE XII

Kraft lignin, 25 g. in 30 ml. of 1 N sodium hydroxide, was heated with trimethylolmelamine made by condensing 3.8 g. melamine and 3 g. formaldehyde at 80° C. for 2 hours at pH 10.5. The reaction solution was added directly to an aqueous dispersion difficult to coagulate.

EXAMPLE XIII

The product of Example XI, 10 grams in 100 ml. water, was stirred with 1.5 grams of cyanuric chloride at about 10° C. for 1 hour and then additionally stirred at ambient temperature for an additional hour. The reaction solution was added directly to an aqueous dispersion difficult to coagulate.

EXAMPLE XIV

The product of Example III, 18.6 grams in 200 ml. water, was stirred with 4 grams of 2,4-dichloro-6-methoxy-s-triazine dissolved in 20 ml. dioxane at about 10° C. for approximately one hour. The reaction solution was added directly to an aqueous dispersion difficult to coagulate.

EXAMPLE XV

A solution of a caustic extract of Douglas fir bark, 6.65 grams in 100 ml. water, was treated with 4.3 grams N,N diethylglycidylamine adjusted to a pH of 3, and stirred for about 60 hours. The reaction solution was added directly to an aqueous dispersion difficult to coagulate.

EXAMPLE XVI

A solution of a caustic extract of Douglas fir bark with the wax removed, 20 grams in 200 ml. water, was stirred overnight with 10.1 grams of an amine-modified epoxy compound having the formula

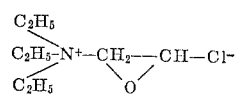

The reaction solution was added directly to an aqueous dispersion difficult to coagulate.

EXAMPLE XVII

A solution of kraft lignin, 25 grams in 125 ml. of 1 N sodium hydroxide was shaken with the amine-modified epoxy compound of Example XVI for about 20 hours. The reaction solution was added directly to an aqueous dispersion difficult to coagulate.

EXAMPLE XVIII

A solution of a caustic extract of Douglas fir bark, 10 grams in 200 ml. water, was stirred with 1.7 grams of a hydrazide having the formula

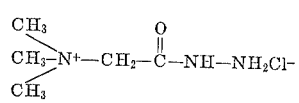

for 30 minutes at room temperature. The reaction solution was added directly to an aqueous dispersion difficult to coagulate.

EXAMPLE XIX

A solution of kraft lignin, 16 grams in 200 ml. water containing 9 grams of sodium hydroxide, was stirred for 30 minutes at room temperature with 1.7 grams of a hydrazide having the following formula:

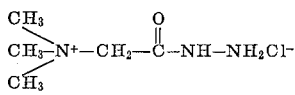

The reaction solution was added directly to an aqueous dispersion difficult to coagulate.

ples were tested as coagulants for a 1% dispersion of titanium dioxide in water using the Jar-Test Procedure as described in Volume 49 of the Journal of the American Water Works Association, November 1957, pages 1425–1431 and the results tabulated in Table I. The settling time after the mixing was stopped was taken as the time for the floc to fall to the 20 ml. mark on a 100 mm. graduated cylinder. NT and T in Table I are abbreviations of "not transparent" and "transparent." The floc size was determined by visual estimation.

TABLE I

| Product of Example Nos. | Intrinsic viscosity | Weight used mg./g. TiO₂ | Floc size (visual estimates) | Settling time, min. | Turbidity of supernatant liquor | |
|---|---|---|---|---|---|---|
| | | | | | Immediate | Final |
| I | 0.12 | 2 | Large | 3 | NT | T |
| II | 0.04 | 1 | Small | Slow | NT | T |
| III | 0.12 | 2.5 | do | 6 | NT | T |
| IV | 0.06 | 2 | Med.-large | 4.5 | NT | T |
| V | 0.04 | 1 | Small | 5 | NT | T |
| VI | 0.15 | 1 | Med.-large | 3.5 | NT | T |
| VII | 0.09 | 1.25 | do | 4.25 | NT | T |
| VIII | 0.06 | 1.25 | Med | 4.5 | NT | T |
| IX | | 2 | Small | 6.5 | NT | T |
| X | 0.16 | 2.5 | Med | 6 | NT | T |
| XI | 0.13 | 1.1 | Med.-small | 4 | NT | T |
| XII | 0.10 | 1 | Med | 5 | NT | T |
| XIII | 0.04 | 4 | Med | 5 | NT | T |
| XIV | 0.13 | 2.5 | Med | 3.5 | NT | T |
| XV | | 1 | Small | 4.5 | NT | T |
| XVI | | 1–2 | Very small | | NT | NT |
| XVII | | 2 | do | | NT | NT |
| XVIII | | 2 | Med.-small | | NT | T |
| XIX | | 1.5 | Small | | NT | T |
| XX | | 0.5 | do | | NT | T |
| XXI | | 2.5 | Med.-large | 15 | NT | T |
| XXII | 0.14 | 1 | Med | 3 | NT | T |

EXAMPLE XX

A solution of sodium lignosulfonate, 20 grams in 150 ml. water at pH 4.8, was stirred overnight at room temperature with 1.7 grams of a hydrazide having the same formula as that in Example XIX. The reaction solution was added directly to an aqueous dispersion difficult to coagulate.

EXAMPLE XXI

A solution of a caustic extract of Douglas fir bark with the wax fraction removed, 20 grams in 200 ml. water, was digested to a pH of about 6 using 50% hydrochloric acid and treated at room temperature with 4.3 grams of ethyleneimine added dropwise with stirring. The pH was maintained at 6 by the simultaneous addition of 50% hydrochloric acid. After stirring for about 1½ hours, the reaction mixture was digested to pH 2 using 50% hydrochloric acid and again treated at room temperature with 2.4 grams of ethyleneimine added dropwise with stirring. The pH was maintained in the 2–3 pH range by the simultaneous addition of 18.3 ml. of 50% hydrochloric acid and the reaction mixture stirred overnight. The reaction solution was added directly to an aqueous dispersion difficult to coagulate.

EXAMPLE XXII

A solution of kraft lignin, 25 grams in 500 ml. aqueous sodium hydroxide, was adjusted to pH 6 using concentrated hydrochloric acid and treated at room temperature with 4.3 grams of ethyleneimine added dropwise with stirring. The pH was maintained at 6 by the simultaneous dropwise addition of concentrated hydrochloric acid. After stirring for 1 hour, the reaction mixture was allowed to stand overnight at room temperature. A brown powder separated from the solution. This fraction was isolated by reduction of the pH to 0.3 with 6% sulfuric acid solution and centrifugation. After purification by repeated water washings, the fraction was oven-dried and found to contain 1.6% nitrogen. A portion of the total reaction mixture was rendered alkaline and evaporated to dryness. The solid obtained corresponded to 62.5 grams of product and contained 2.25% nitrogen representing 100% of the added ethyleneimine. This product was added directly to an aqueous dispersion difficult to coagulate.

The compounds prepared according to the above exam-

The chemically modified forest-derived products made according to the above examples were also evaluated as coagulation aids in conjunction with alum for a titanium dioxide dispersion in water. The results are shown in Table II. The light transmittance is an indication of the effectiveness of the coagulant in conjunction with the coagulation aid—the higher the transmittance the better the coagulation. In Table II, the amount of alum used was 1.5% by weight of the titanium dioxide solids. The total mixing time was 12 minutes and the flocculation formation mixing speed was about 50 r.p.m. Light transmittance was measured after 30 minutes settling time. Both modified and unmodified phenolic forest-derived products were tested.

TABLE II

Alum plus coagulant aid—1% titanium dioxide dispersion in water

| Aid | Usage, percent by wt. of TiO₂ solids | Percent light transmittance | Usage, percent by wt. of TiO₂ solids | Percent light transmittance |
|---|---|---|---|---|
| Alum alone—no coagulation aid | | 0 | | 0 |
| Product of Example: | | | | |
| VI | 0.25 | 80 | 0.275 | 84 |
| XIV | 0.225 | 75 | 0.275 | 72 |
| I | 0.22 | 65 | 0.28 | 79 |
| III | 0.23 | 50 | 0.29 | 72 |
| XXI | 1.00 | 94 | | |
| Alkaline extract of Douglas fir bark | 0.26 | 64 | 0.31 | 68 |
| Orzan P (modified ammonium lignosulfonate) | 0.25 | 59 | 0.35 | 90 |
| Orzan S (sodium lignosulfonate) | 0.25 | 87 | 0.35 | 93 |
| Maraperse C (calcium lignosulfonate) | 0.25 | 87 | 0.30 | 90 |
| Indulin C (sodium salt of alkali lignin) | 0.25 | 83 | 0.20 | 78 |

As shown in Table II, alum alone was completely ineffective in coagulating the titanium dioxide dispersion. Alum in conjunction with the various modified and unmodified bark extractives and pulping liquors, however, showed a marked increase in the coagulation ability of the alum mixture.

In Table III, the chemically modified products were tested as coagulation aids in a clay-river system. To Columbia River water containing about 0.2% by weight suspended and dissolved solids was added .70% by weight clay (Georgia-Kaolin Hydrite R). The alum usage was 1.71% by weight of the solids in the water. Total mixing time was 6 minutes and the floc formation mixing speed was 30 r.p.m. The percent light transmission measurements were taken after 30 minutes settling time.

TABLE III

Alum plus coagulant aid—0.72 solids in Columbia River water

| Aid | Usage, percent by wt. of river water solids | Percent light trans. | Usage, percent by wt. of river water solids | Percent light trans. | Usage, percent by wt. of river water solids | Percent light trans. |
|---|---|---|---|---|---|---|
| Alum alone—no coagulant aid | 0.069 | 91 | 0.139 | 91 | 0.208 | 91 |
| Product of Example: | | | | | | |
| XXI | 0.069 | 91 | 0.139 | 96 | 0.208 | 96 |
| XIV | 0.069 | 91 | 0.139 | 93 | 0.208 | 93 |
| VI | 0.069 | 92 | 0.139 | 93 | 0.208 | 94 |
| III | 0.069 | 92 | 0.139 | 93 | 0.208 | 93 |
| I | 0.069 | 88 | 0.139 | 92 | 0.208 | 94 |
| XXII | 0.069 | 95 | 0.139 | 95 | 0.208 | 96 |
| Alkaline extract of Douglas fir bark | 0.069 | 89 | 0.139 | 89 | 0.208 | 90 |

Unmodified caustic alkaline extract of Douglas fir bark was tested as a coagulation aid in conjunction with a commercially available polyelectrolyte, Separan NP 10, a nonionic polyacrylamide of the Dow Chemical Company. Polyethyleneimine was also tested. Separan NP 10 and the unmodified caustic extract of Douglas fir bark were added to 1% dispersion of titanium dioxide in water and evaluated according to the Jar-Test Procedure as described in connection with Table I. The results are shown below in Table IV.

TABLE IV

| Coagulant | Amount used, mg./g. $TiO_2$ | Floc size | Settling time, mins. | Turbidity of supernatant liquor Immediate | Final |
|---|---|---|---|---|---|
| Separan NP 10 | 0.5 | Large | 1.5 | NT | NT |
| Separan NP 10 Plus Alkaline extract of Douglas fir bark | 0.25<br>0.5 | Very large | 1.0 | NT | T |
| Polyethyleneimine Plus Alkaline extract of Douglas fir bark with wax fraction removed | 0.2<br>2.5 | Med. large | 5 | NT | T |

The addition of the alkaline extract of Douglas fir bark to the Separan NP 10 permitted a 50% reduction in the Separan NP 10 level and resulted in faster settling and a clear supernatant liquor.

To demonstrate the dependence of the coagulant properties of lignin-derived products on molecular weight and hence intrinsic viscosity oxidative coupling reactions were evaluated using various oxidizing agents and conditions.

EXAMPLES XXIII–XXXII

A solution of 12.1 grams sodium lignosulfonate (Marasperse "N"), 8.9 grams sodium chloride and 8.1 grams sodium dichromate in 100 ml. water was allowed to stand at room temperature. Samples (10 ml.) were withdrawn every fifteen minutes and diluted to 100 ml. with distilled water until the reaction mixture gelled after 2⅓ hr. The intrinsic viscosity number of these samples are collected in Table V.

TABLE V

| Example No. | Reaction time elapsed, minutes | Intrinsic viscosity (g.-dl$^{-1}$) |
|---|---|---|
| XXIII | 5 | 0.047 |
| XXIV | 20 | 0.054 |
| XXV | 35 | 0.066 |
| XXVI | 50 | 0.073 |
| XXVII | 60 | 0.080 |
| XXVIII | 80 | 0.082 |
| XXIX | 95 | 0.089 |
| XXX | 110 | 0.105 |
| XXXI | 125 | 0.216 |
| XXXII (gel) | 140 | 0.244 |

The coagulating characteristics of these modified lignosulfonates were determined at 26+1° using a freshly prepared suspension (0.5% w./v.) of kaolin clay (Astra Glaze, 2μ colloidal sige, Georgia Kaolin, 433 N. Broad Street, Elizabeth, N.J.) in distilled water as a standard contaminated water. A sample of this clay suspension (90 ml.) in a 100 ml. graduated cylinder was shaken first with a solution of alum ($Al_2(SO_4)_3 \cdot 18H_2O$, 5 mg.) in water (5 ml.) and then treated with the modified lignosulfonate samples 1 through 10. The time taken for the boundary line of coagulated material to fall to the 60 ml. mark on the cylinder was taken as the time for coagulation. The volume of the lignosulfonate derived flocs was also noted when the control floc containing 0% lignosulfonate reached the 60 ml. mark. Using this test, samples XXIII–XXIX inclusive showed no coagulation properties, and the control suspension containing only the alum settled as fast as or faster than the lignosulfonate-treated samples. In fact these samples still showed dispersant properties as exemplified by Example XXIX in Table VI. In contrast, sample XXX, XXXI and XXXII showed the coagulating properties summarized in Table VI.

TABLE VI

| Designation Sample No. | Lignosulfonate added, p.p.m. | Settling time,[1] secs. | Floc vol.,[2] ml. |
|---|---|---|---|
| XXIX | 0 | 295 | 60 |
|  | 4.3 | 355 | 66 |
|  | 8.7 | 355 | 65 |
| XXX | 0 | 325 | 60 |
|  | 4.3 | 315 | 58 |
|  | 8.7 | 300 | 56 |
|  | 13.0 | 270 | 52 |
|  | 17.4 | ([3]) | --- |
| XXXI | 0 | 335 | 60 |
|  | 4.3 | 235 | 54 |
|  | 8.7 | 225 | 43 |
|  | 13.0 | 195 | 34 |
|  | 21.7 | ([3]) | --- |
| XXXII | 0 | 325 | 60 |
|  | 4.3 | 250 | 46 |
|  | 8.7 | 205 | 36 |
|  | 13.0 | ([3]) | --- |

[1] Elapsed time for floc to reach 60 ml. mark.
[2] Volume of floc measured at time control (alum only) reached 60 ml.
[3] No settling.

EXAMPLE XXXIII

A dichromate-coupled bark extract was made by dissolving 10 grams of dry, spray dried alkaline extract of Douglas fir bark with waxes removed in 40 grams of distilled water. A solution of sodium dichromate made by dissolving 7 grams sodium dichromate in 43 grams of water was added. The mixture was stirred for several minutes and the foam was removed. The mixture was covered and left overnight at room temperature. 90.3 grams of the stiff gel was blended with 100 grams of water on a Waring Blendor at high speed to produce a stable, dark brown, cloudy suspension. Part of this mixture was further diluted to 0.5 gram of gel per 100 ml. with distilled water for viscosity measurement and coagulation tests. The results are presented in Tables VII and VIII.

EXAMPLE XXXIV

The lower molecular weight fraction of sodium lignosulfonate (Marasperse "N"), was removed by dialysis and the remaining fraction was diluted to a 15% by weight solution with distilled water. 16.5 grams of the 15% by weight dialyzed sodium lignosulfonate was further diluted with 33.3 grams of distilled water. The solution was cooled to 1° C. and maintained at pH 10 with a 25% by weight solution of sodium hydroxide. 5 ml. of 1 normal solution of potassium ferricyanide was added over a 5-minute period with constant stirring. The mixture was set in a refrigerator overnight. The resulting light gel was broken with stirring. The solubles were recovered by centrifuging and filtering. 11 grams of the filtrate was diluted to 100 ml. to give a solution containing approximately .5 gram of lignosulfonate per 100 ml. This solution was used for viscosity measurements and coagulation tests, the results of which are reported in Tables VII and VIII.

EXAMPLE XXXV

A spent sulfite pulping liquor was oxidatively coupled with dichromate by mixing 67 grams of 15% by weight aqueous solution of oven-dried solids liquor with a solution of 7 grams of sodium dichromate in 26 grams of warm water. This solution began to gel in about 6 hours while being stirred at room temperature. After standing overnight, 54.6 grams of gel was blended at high speed for 8 minutes with 100 grams of distilled water. The mixture was diluted with distilled water to give a working solution containing 0.5 gram of oven dry solids per 100 ml. for coagulation and viscosity measurements. Results are presented in Tables VII and VIII.

Examples XXXIII through XXXV of coupled lignin derivatives and their precursors were examined by viscometry and were subjected to the same coagulation tests used for Examples XXIII through XXXII for dichromate-coupled undialyzed sodium lignosulfonate. Intrinsic viscosity numbers are given in Table VII. Coagulation results are given in Table VIII.

Precursor solutions were all made up to the same concentration as their coupled versions—0.5 gram per 100 ml.

TABLE VII.—INTRINSIC VISCOSITY NUMBERS OF OXIDATIVELY COUPLED LIGNINS AND THEIR PRECURSORS

| Example No. | Lignin Derivative | Concentration, g./100 ml. | Intrinsic viscosity |
|---|---|---|---|
| XXXIII | Bark extract | 0.5 | 0.054 |
|  | Dichromate-coupled bark extract | 0.5 | 0.59 |
| XXXIV | Dialysed sodium lignosulfonate | 0.5 | 0.077 |
|  | Ferricyanide-coupled dialysed sodium lignosulfonate | 0.5 | 0.75 |
| XXXV | Spent sulfite liquor | 0.5 | 0.027 |
|  | Dichromate-coupled spent sulfite liquor | 0.5 | 0.58 |

The oxidatively coupled forest-derived materials shown in Examples XXIII through XXXII demonstrate a marked increase in coagulation action for the samples having an intrinsic viscosity in excess of 0.1. Below this value for intrinsic viscosity, the forest-derived material exhibits well-known dispersant properties discussed in detail in the prior art. The marked and unexpected increase in coagulation capabilities of higher molecular weight forest-derived materials is clearly demonstrated by the data presented in the examples discussed above.

I claim:

1. A method of clarifying a dilute aqueous suspension of solid particulate matter which comprises introducing into the suspension at least one polymeric coagulant in an amount sufficient to cause formation and maintenance of a floc of the solid particles, the polymeric coagulant being a compound obtained by the reaction of lignin containing materials with a reagent which causes an increase in the molecular weight by polymerization of said lignin containing materials such that said polymeric coagulant has an intrinsic viscosity exceeding about 0.1; and, permitting said floc to settle.

2. The method of claim 1 wherein said lignin containing materials are subjected to phenolic coupling by reaction with an oxidizing agent for coupling said lignin containing materials.

3. The method of claim 2 wherein said oxidizing agent is chosen from the group consisting of ferric chloride, oxygen, hydrogen peroxide and alkali metal persulfates, permanganates, perborates, ferricyanide, and dichromates.

4. The method of claim 1 wherein said reagent is selected from the group consisting of
   (1) a triazine derivative designated by the formula

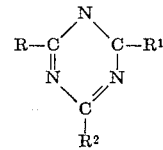

where R, R¹, and R² are chlorine, methoxy groups of —NHCH₂OH groups
   (2) Y—CH₂—(CH₂)ₙ—X where $n$ is a positive integer from 0 to 5; X is one of the following:

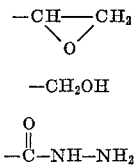

—CH₂OH $$-\overset{O}{\underset{\|}{C}}-NH-NH_2$$

TABLE VIII.—SETTLING RATES AND RELATIVE SETTLING VOLUMES OF KAOLIN CLAY SUSPENSIONS USING ALUM AND OXIDATIVELY COUPLED LIGNINS AND THEIR PRECURSORS

| Example Number | Lignin derivative | Alum, p.p.m. | Lignin derivative added, p.p.m. | Time to settle to 60 ml., secs. | Floc volume at time alum-alone floc reaches 60 ml., ml. |
|---|---|---|---|---|---|
| XXXIII | Bark extract | 53 | 0 | 390 | 60 |
|  |  | All concentrations |  | No settling—dispersant action |  |
|  | Dichromate coupled bark extract | 53 | 0 | 390 | 60 |
|  |  | 53 | 8.8 | 270 | 46 |
|  |  | 53 | 12.3 | 239 | 40 |
|  |  | 53 | 17.6 | 234 | 40 |
|  |  | 53 | 35.2 | No settling. |  |
| XXXIV | Dialysed sodium lignosulfonate | 53 | 0 | 345 | 60 |
|  |  | All concentrations |  | No settling—dispersant action |  |
|  | Ferricyanide coupled dialysed sodium lignosulfonate | 53 | 0 | 345 | 60 |
|  |  | 53 | 1.8 | 275 | 50 |
|  |  | 53 | 3.5 | 210 | 38 |
|  |  | 53 | 8.8 | 175 | 32 |
|  |  | 53 | 17.6 | 145 | 30 |
|  |  | 53 | 35.2 | 195 | 34 |
|  |  | 53 | 52.8 | Poor settling. |  |
| XXXV | Spent sulfite liquor | 53 | 0 | 320 | 60 |
|  |  | All concentrations |  | No settling—dispersant action |  |
|  | Dichromate coupled spent sulfite liquor | 53 | 0 | 320 | 60 |
|  |  | 53 | 8.8 | 239 | 49 |
|  |  | 53 | 17.6 | 142 | 33 |
|  |  | 53 | 35.2 | 133 | 31 |
|  |  | 53 | 70.4 | Poor settling. |  | and Y is one of the following:

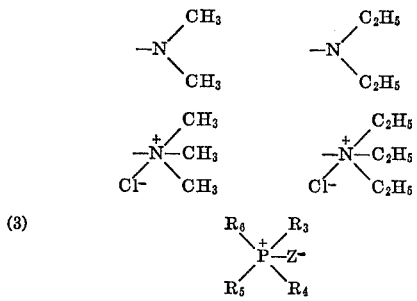

(3)

$$\begin{array}{c} R_6 \quad R_3 \\ \diagdown \overset{+}{P}\diagup \\ \diagup \quad \diagdown -Z^- \\ R_5 \quad R_4 \end{array}$$

where $Z^-$ is chlorine or bromine, and $R_3$, $R_4$, $R_5$, and $R_6$ are methylol groups; and (4)

$$\begin{array}{c} R_{10} \quad\quad R_7 \\ \diagdown C\!\!-\!\!C\diagup \\ \diagup \quad | \quad \diagdown \\ R_{11} \quad N \quad R_8 \\ \quad | \\ \quad R_9 \end{array}$$

where $R_7$, $R_8$, $R_9$, $R_{10}$, and $R_{11}$ are hydrogen, aliphatic and aromatic groups.

5. Method according to claim 2 wherein an inorganic coagulant is added to the aqueous medium.

6. Method according to claim 5 wherein the inorganic coagulant is one selected from the group consisting of alum, sodium aluminate, ferric sulfate, ferric chloride, ferrous sulfate, and lime.

7. A method of water treatment to remove solid particles suspended therein which comprises introducing into a dilute aqueous suspension of solid particulate matter at least one inorganic coagulant and at least one polymeric coagulation aid comprising the reaction product formed by phenolic coupling under acid conditions of a lignin containing material chosen from the group consisting of extracts of barks of trees, kraft lignins and sulfite lignins, said reaction product having an intrinsic viscosity exceeding about 0.1; and, permitting the coagulated solid particles to settle.

8. The method of claim 7 wherein said polymeric coagulation aid has a molecular weight exceeding 500,000.

9. The method of claim 7 wherein said coagulation aid is formed by polymerization of said lignin containing material in the presence of a reagent selected from the group consisting of hydrogen peroxide, alkali metal persulfates, alkali metal perborates, alkali metal permanganates, alkali metal dichromates, ferric chloride, alkali metal ferri-cyanides, and oxygen.

10. The method of claim 1 wherein said polymeric coagulant has a molecular weight exceeding 500,000.

References Cited

UNITED STATES PATENTS

| | | | |
|---|---|---|---|
| 3,138,555 | 6/1964 | King et al. | 260—124.3X |
| 3,168,511 | 2/1965 | King et al. | 260—124.3 |
| 3,407,188 | 10/1968 | Cavagna | 260—124.3 |
| 2,200,784 | 5/1940 | Wallace | 210—54 |
| 2,415,439 | 2/1947 | Nelson | 210—54X |
| 2,471,474 | 5/1949 | Alba et al. | 210—54X |

OTHER REFERENCES

Hibbert, H., Status of the Lignin Problem, Technical Association Papers, Series XXIV, 1941, pp. 492–501.

MICHAEL ROGERS, Primary Examiner

U.S. Cl. X.R.

252—181; 260—124

UNITED STATES PATENT OFFICE
CERTIFICATE OF CORRECTION

Patent No. 3,600,308      Dated August 17, 1971

Inventor(s) George G. Allan

It is certified that error appears in the above-identified patent and that said Letters Patent are hereby corrected as shown below:

Column 13, lines 22 and 23 should read:

-- where $R_7$, $R_8$, $R_9$, $R_{10}$, and $R_{11}$ are hydrogen, aliphatic, aromatic or various substituted aliphatic and aromatic groups. --

Signed and sealed this 18th day of January 1972.

(SEAL)
Attest:

EDWARD M. FLETCHER, JR.      ROBERT GOTTSCHALK
Attesting Officer      Acting Commissioner of Patents